US010650040B2

(12) United States Patent
Dube et al.

(10) Patent No.: US 10,650,040 B2
(45) Date of Patent: May 12, 2020

(54) OBJECT RECOGNITION OF FEATURE-SPARSE OR TEXTURE-LIMITED SUBJECT MATTER

(71) Applicant: A9.com, Inc., Palo Alto, CA (US)

(72) Inventors: Simant Dube, Sunnyvale, CA (US); Edward Hsiao, Sunnyvale, CA (US)

(73) Assignee: A9.com, Inc., Palo Alto, CA (US)

( * ) Notice: Subject to any disclaimer, the term of this patent is extended or adjusted under 35 U.S.C. 154(b) by 424 days.

(21) Appl. No.: 15/601,505

(22) Filed: May 22, 2017

(65) Prior Publication Data

US 2017/0255648 A1 Sep. 7, 2017

Related U.S. Application Data

(63) Continuation of application No. 14/209,642, filed on Mar. 13, 2014, now Pat. No. 9,720,934.

(51) Int. Cl.
| | |
|---|---|
| *G06F 16/00* | (2019.01) |
| *G06F 16/583* | (2019.01) |
| *G06K 9/62* | (2006.01) |
| *G06K 9/52* | (2006.01) |
| *G06K 9/46* | (2006.01) |

(52) U.S. Cl.
CPC ............ *G06F 16/583* (2019.01); *G06K 9/46* (2013.01); *G06K 9/52* (2013.01); *G06K 9/6201* (2013.01); *G06K 9/6267* (2013.01)

(58) Field of Classification Search
CPC ............................... G06F 16/53; G06F 16/535
See application file for complete search history.

(56) References Cited

U.S. PATENT DOCUMENTS

| | | | |
|---|---|---|---|
| 2002/0057343 A1 | 5/2002 | Ronk et al. | |
| 2011/0131241 A1* | 6/2011 | Petrou | G06F 16/95 |
| | | | 707/770 |
| 2011/0312374 A1 | 12/2011 | Chen et al. | |
| 2012/0057032 A1* | 3/2012 | Jang | G06K 9/228 |
| | | | 348/207.1 |

(Continued)

OTHER PUBLICATIONS

D.A. Lisin, Combining Local and Global Image Features for Object Class Recognition, Jun. 25, 2005, 2005 IEEE Computer Society Conference on Computer Vision and Pattern Recognition (CVPR'05).

(Continued)

*Primary Examiner* — Thu Nguyet T Le
(74) *Attorney, Agent, or Firm* — Hogan Lovells US LLP (57) ABSTRACT

An object recognition system can be adapted to recognize subject matter having very few features or limited or no texture. A feature-sparse or texture-limited object can be recognized by complementing local features and/or texture features with color, region-based, shape-based, three-dimensional (3D), global, and/or composite features. Machine learning algorithms can be used to classify such objects, and image matching and verification can be adapted to the classification. Further, multiple modes of input can be integrated at various stages of the object recognition processing pipeline. These multi-modal inputs can include user feedback, additional images representing different perspectives of the object or specific regions of the object including a logo or text corresponding to the object, user behavior data, location, among others.

20 Claims, 7 Drawing Sheets

(56) References Cited

U.S. PATENT DOCUMENTS

2012/0308126 A1    12/2012   Hwang et al.

OTHER PUBLICATIONS

Notice of Allowance issued in U.S. Appl. No. 14/209,642, dated Apr. 7, 2017, 10 pages.
Advisory Action issued in U.S. Appl. No. 14/209,642, dated Mar. 9, 2017, 3 pages.
Final Rejection issued in U.S. Appl. No. 14/209,642, dated Dec. 15, 2016, 25 pages.
Non-Final Rejection issued in U.S. Appl. No. 14/209,642, dated Jul. 13, 2016, 19 pages.

* cited by examiner

OBJECT RECOGNITION OF FEATURE-SPARSE OR TEXTURE-LIMITED SUBJECT MATTER

CROSS-REFERENCES TO RELATED APPLICATIONS

This application is a continuation of allowed U.S. application Ser. No. 14/209,642, entitled "OBJECT RECOGNITION OF FEATURE-SPARSE OR TEXTURE-LIMITED SUBJECT MATTER," filed Mar. 13, 2014; of which the full disclosure of this application is incorporated herein by reference for all purposes.

BACKGROUND

Object recognition is a computer vision task with applications in disciplines such as security, optical character/digit/document recognition, industrial inspection, content-based image retrieval (CIBR), robotics, medical imaging, intelligent navigation systems, augmented reality, among others. In the field of security, for example, object recognition can be used for keyless access for buildings or computing devices via facial or biometric recognition (e.g., iris or fingerprint recognition) or video surveillance for identifying potential intruders. In the field of augmented reality, object recognition can be utilized to enhance interaction with physical objects. For instance, a live view of the physical object can be captured and displayed on a computing device, and metadata relating to the physical object can be overlayed upon the live view of the physical object after the physical object has been identified. Accordingly, a user interested in acquiring information about a book or DVD in his or her proximity, can capture an image of the book or DVD and submit the captured image to an object recognition system to obtain information associated with the book or DVD. To accomplish this, local features of the captured image can be extracted and compared to feature descriptors stored in a database of the object recognition system. Once a match is identified, information associated with the matching image (e.g., synopsis, availability, or other information for purchasing the book or DVD) can be provided and displayed to the user on his or her computing device. Not all items, however, may be as feature-rich or texture-rich as books or DVDS. For example, items such as computing devices (e.g., laptop computers, smart phones, tablets, e-book readers), displays (e.g., televisions, monitors, all-in-one desktop computers), or kitchen appliances (e.g., stoves, refrigerators, microwaves) may be feature-sparse or have limited or no texture. That is, the surfaces of these items may be generally uniform and/or lacking in interest points such that these items that may not be as amenable to conventional object recognition approaches, and identifying such items may be less successful.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches for identifying an object represented in an image. In particular, various approaches enable recognition of objects that are local feature-sparse or that may have limited or no texture. As used herein, a "local feature" refers to an image pattern which differs from its immediate neighborhood. A local feature can be associated with a change of an image property or several properties simultaneously (e.g., intensity, color, texture, among others), although not necessarily localized exactly on this change. Local features can be points, edges, or small patches. In various embodiments, local feature-sparse objects or objects with limited texture can be recognized by complementing local features with "non-local features," such as color features; region-based features (e.g., image segmentation-based features); shape-based features (e.g., contour, edge, line, boundary segment, gradient flow, or orientation field based-features); global or top-level features (e.g., image attributes and image classification labels); and composite features (e.g., including a combination of two or more of the aforementioned features). In at least some embodiments, objects represented in images can also be associated with three-dimensional (3-D) features, among other possibilities. In various embodiments, recognition of local feature-sparse objects or objects with limited or no texture can be improved using multiple modes of input at various stages of the object recognition processing pipeline. For example, user feedback by way of confirmation of a type or category of an object (e.g., book, DVD, electronics, clothing, shoes, etc.) can be obtained following classification of the object represented in a query image. As another example, the user may be asked to capture another image of a different perspective of the object or a particular portion of the object that includes a logo or text. As yet another example, instructions may be provided to the user to capture an image of the query object with another object of known dimensions, such as a ruler, a soda can, or a user's hand, to contextualize the dimensions of the query object. In various embodiments, machine learning techniques can be used at various stages of the object recognition processing pipeline to enable recognition of feature-sparse or texture-limited objects, including the stages of image segmentation, image matching, global feature extraction, vocabulary building, among others.

In various embodiments, an object recognition system is provided that enables a query image, including a representation of at least one object, to be received to the system and one or more database objects to be matched to the object represented in the query image. In an embodiment, the system may be associated with an electronic marketplace and the database objects may be products available for purchase from the electronic marketplace. In an embodiment, the system can extract local features from the query image using a feature detection algorithm (e.g., Harris corner detection, Canny edge detection, Scale Invariant Feature Transform (SIFT), Accumulated Signed Gradient (ASG) features, etc.) and the extracted features can be used to compare against feature descriptors stored within an image database or index.

In certain situations, an object represented in an image may not be recognized based on local features or texture-based features. For example, an object recognition system may attempt to identify the object based on local features (e.g., Harris corners, Canny edges, SIFT features, ASG features) or texture-based features but the system may not return any results, the wrong result, or too many results depending on the particular implementation. In other situations, a number of the local features extracted from the query image may be below a threshold number, or other representations for interest points or texture (e.g., contrast, coarseness, directionality, linelikeness, regularity, roughness, etc.) may be determined to be below threshold values. That is, the query image may include a representation of a local feature-sparse object or an object with limited or no texture. Thus, in various embodiments, representation of a query object can be supplemented using non-local features, such as color features, region features, shape-based features, global features, 3-D features, and/or composite features, among others. In various embodiments, visual words can be assigned to these extracted features. In some embodiments, a vocabulary can be used to reduce the dimensions of extracted features for scalability of the system. For example, a Hierarchical K-means (HKM) algorithm can be used to cluster the extracted features, and, after clustering, the cluster centers can each be assigned a visual word to textually describe each respective image (i.e., Bag-of-Words (BoW)). A similar approach can be used to represent each image within a product database to generate an index of visual words. Each visual word representing the query image can then be compared against the visual words stored in the index of visual words by a search engine in a manner similar to that employed by text retrieval techniques. As a result, a set of closest matching images from the product database that at least partially match the query image can be determined based at least in part upon matching visual words. In some embodiments, putative matching images can be verified using a verification algorithm such as RANdom SAmple Consensus (RANSAC) or its variants. In addition, or alternatively, putative matching images can be verified via other modes of input. In various embodiments, information about the products corresponding to the matching images can be retrieved and provided to the user. In some embodiments, the information can be presented to the user by overlaying the information in a live camera view of the query object.

Various other functions and advantages are described and suggested below as may be provided in accordance with the various embodiments.

Figure 1A:
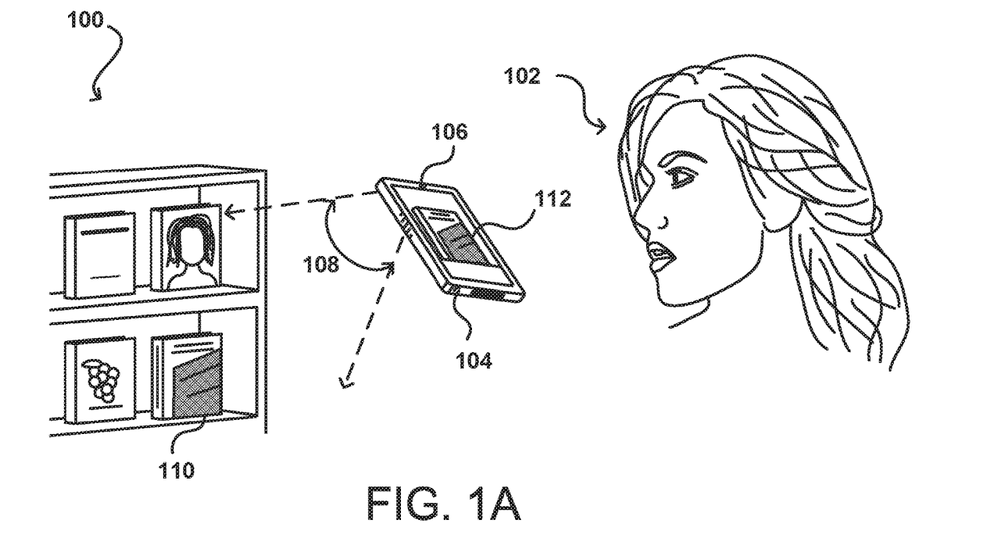
FIGS. 1A and 1B illustrate examples of a user capturing images of items for which the user wants identified in accordance with various embodiments.

FIG. 1A illustrates an example situation 100 of a user employing her computing device for product discovery or to learn more about a particular product she may be interested in purchasing or otherwise acquiring. In this example, the user 102 is in a location that has a collection of books, and the user is interested in obtaining information about a particular book 110. Using an appropriate application executing on a computing device 104, the user is able to obtain an image of the book 110 by positioning the computing device such that the book is within a field of view 108 of at least one camera 106 of the computing device. Although a portable computing device (e.g., a smart phone, a tablet computer, or an e-book reader) is shown, it should be understood that any electronic device capable of receiving, determining, and/or processing input can be used in accordance with various embodiments discussed herein, where the devices can include, for example, desktop computers, notebook computers, wearable computing devices (e.g., wristwatches, wristbands, head-mounted displays, glasses, etc.), personal data assistants, video gaming consoles, television set top boxes, smart televisions, and portable media players, among others.

In this example, a camera 106 on the device 104 can capture image information including the book 110 of interest, and at least a portion of the image can be displayed on a display screen 112 of the computing device. At least a portion of the image information can be analyzed and, upon a match being located, identifying information can be displayed back to the user via the display screen 112 of the computing device 104. The portion of the image to be analyzed can be indicated manually, such as by a user pointing to the book on the screen or drawing a bounding box around the book. In other embodiments, one or more image analysis algorithms can attempt to automatically locate one or more objects in an image. In some embodiments, a user can manually cause image information to be analyzed, while in other embodiments the image information can be analyzed automatically, either on the device or by transferring image data to a remote system or service as discussed later herein.

Figure 1B:
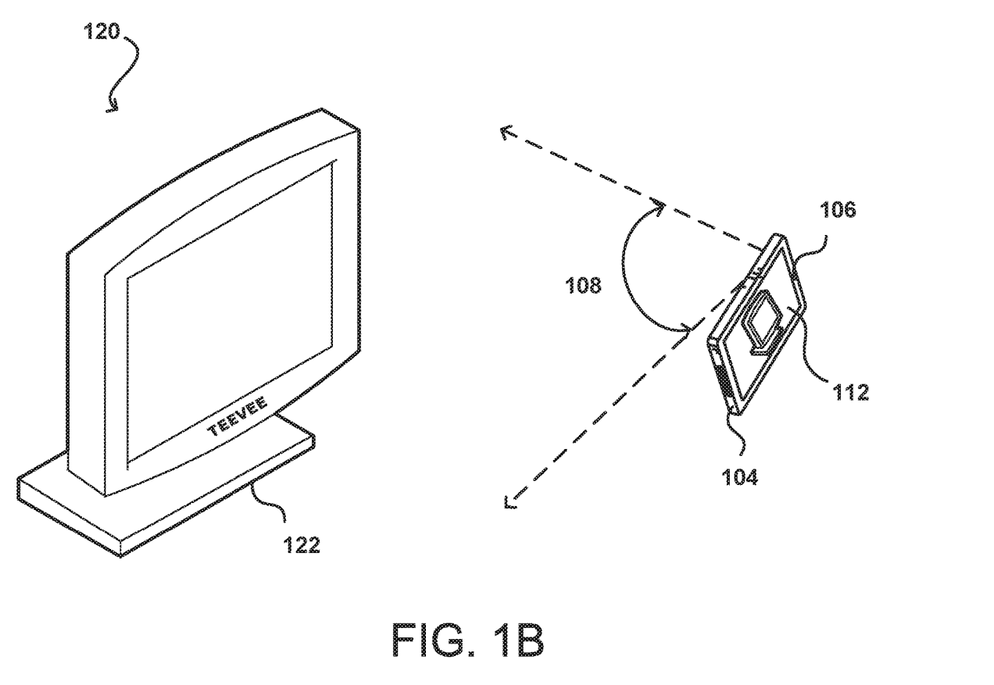

In the example situation 120 of FIG. 1B, the user (not shown) utilizes her computing device 104 to capture an image including a representation of an LCD television set 122. In contrast to the object of interest depicted in FIG. 1A (i.e., book 110), the television 122 is relatively feature-sparse or limited in texture such that the matching algorithms used to identify the book 110 may not successfully identify the television set. For instance, SIFT, ASG, or the like may have been used initially to attempt to identify the book 110 but implementation of the SIFT or ASG algorithm for the television 122 may return no matches, too many matches, or the wrong match. Alternatively, or in addition, the number of local features detected for the television 122 may be determined to be below a local feature threshold. In other embodiments, a query object can be characterized using other approaches, such as the Tamura texture features corresponding to coarseness, contrast, directionality, linelikeness, regularity, and roughness. These texture features can be quantified, as set forth in Fuhui Long et al. "Fundamentals of content-based image retrieval." In Multimedia Information Retrieval and Management, pp. 1-26. Springer Berlin Heidelberg, 2003, which is incorporated herein by reference. Threshold values can be computed and set for each of these texture features, and a query object with texture feature values below threshold texture feature values can be determined to be texture-limited. Other techniques for extracting texture features for a query object include morphological operators, adjacency graphs, Fourier power spectra, co-occurrence matrices, shift-invariant principal component analysis (SPCA), Wold decomposition, Markov random fields, fractal models, Gabor wavelets, among others, which are further discussed in Long et al. When a first object recognition approach fails, a number of local features extracted for a query object fall below a threshold, or the extracted local features are below respective threshold values, different matching approaches can be employed for recognition of the feature-sparse or texture-limited query object, as discussed further below.

Figure 2:
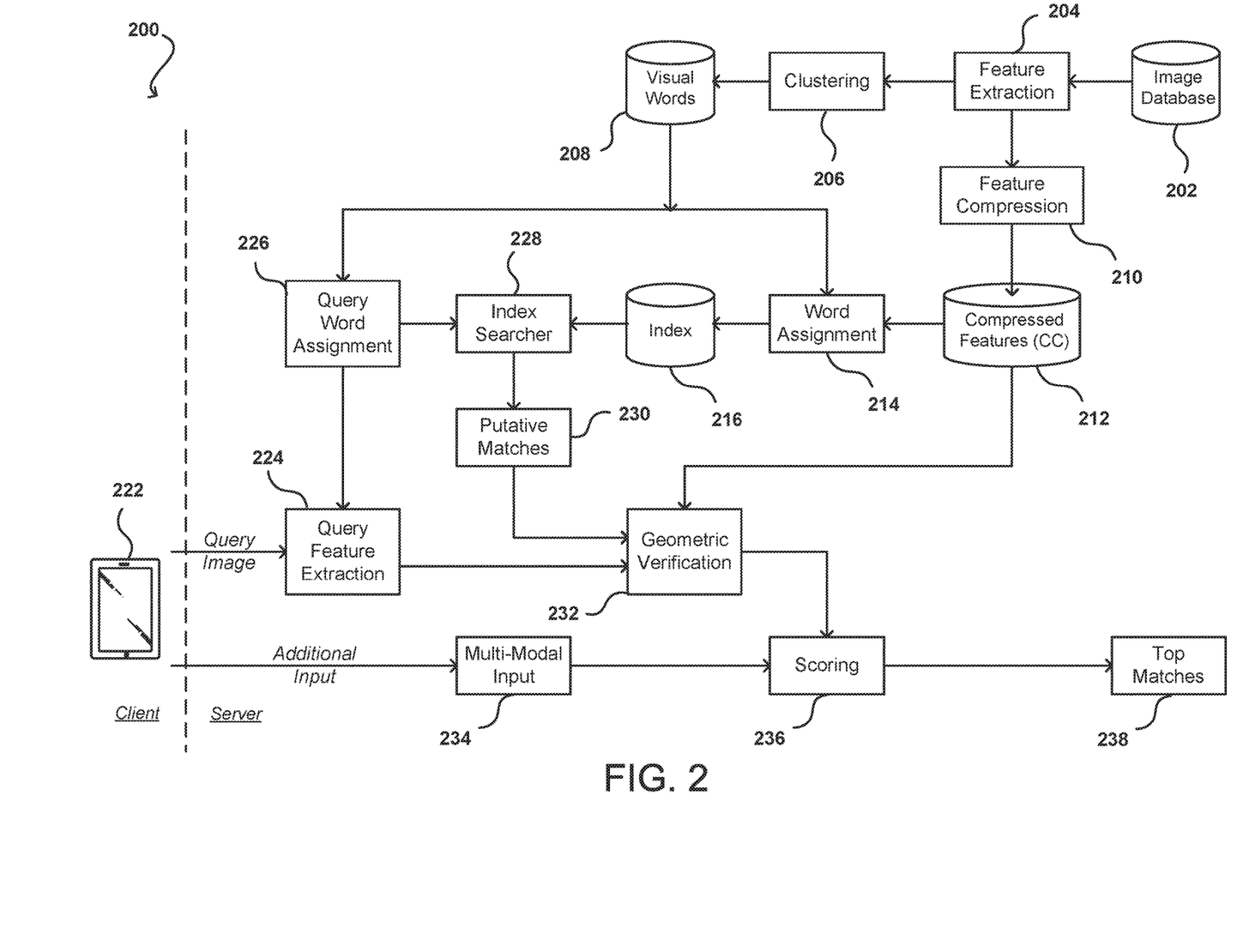
FIG. 2 illustrates an example object recognition system that can be used in accordance with an embodiment.

FIG. 2 illustrates an example object recognition system 200 that can be used in accordance with an embodiment. In this example, image database 202 contains images of items, such as products offered for sale by an electronic marketplace. The system includes a feature extractor module 204 for extracting local features from each image contained in or added to image database 202. As discussed, local features can be sets of pixels of interest within an image, and may include points (e.g., line intersections, high variance points, local curvature discontinuities detected using Gabor wavelets, inflection points of curves, local extrema of wavelet transforms, or corners detected using Harris, Smallest Univalue Segment Assimilating Nucleus (SUSAN), Kanade Shi Tomasi (KLT) corner detection), edges (detected using, e.g., Canny edge detection, Shen-Castan (ISEF) edge detection), or regions of interest (detected, using, e.g., LaPlacian of Gaussian pyramids or Difference of Gaussian pyramids).

In some embodiments, an image pyramid can be constructed to determine local features. The image pyramid is the scale-space representation of a respective image (i.e., it contains various pyramid images), each of which is a representation of the respective image at a particular scale. Such a scale-space representation enables the object recognition system to match images that differ in scale. After determining the feature points of all pyramid images in the image pyramid, the orientation of each feature point can be determined based on the local image gradient at the feature point, which is used to obtain invariance to rotation. After the feature points and their orientations are determined, a patch can be extracted around the feature point in such a way that the orientation descriptor forms one axis of the reference frame for the patch. The local image gradients of the patch are then calculated and transformed into a feature descriptor. The feature descriptor can take into account change in local distortion and illumination (i.e., is invariant to distortion and change in lighting conditions). The feature points, their orientations, and their feature descriptors over all pyramid images form a complete representation of the image. The feature descriptors for each of the database images are then stored and used to compare against query images submitted by users. It should be understood that, in some embodiments, image database 202 does not exist and the actual images are discarded once the local features have been extracted from the images. Further, it will be appreciated that other feature detection algorithms can be used as well within the scope of various embodiments.

As discussed, in particular situations, an object represented in a query image may be determined to be feature-sparse or texture-limited and local features or texture-based features of the query object can be complemented by non-local features, such as color features, region features, shape-based features, global features, 3-D features, and/or composite features. Color can be represented as first order (i.e., mean), second order (i.e., variance), and third order (i.e., skewness) color moments; global or local color histograms; color coherence vectors, wherein each histogram bin is partitioned into two types—coherent if it belongs to a large uniformly-colored region, or incoherent, if it does not; and color correlograms, wherein the first dimension and second dimensions of the three-dimensional histogram are the colors of any pixel pair and the third dimension is their spatial distance.

Region or image segmentation-based features partition an image into similar regions, and include mean-shift clustering or graph cuts, among others. The mean-shift approach finds clusters in the spatial and color space [l, u, v, x, y] where l is the brightness, u and v are the chrominance, and x and y are the location. A large number of hypothesized cluster centers are randomly chosen, and each cluster center is moved to the mean lying inside a multidimensional ellipsoid centered on the cluster center, with some of clusters merging during this mean-shift process. The vector corresponding to the old and new cluster centers are called the mean-shift vectors, and the mean-shift vectors are calculated iteratively until the cluster centers do not change position. In graph cut methods, image segmentation is approached as a graph partitioning problem with pixels representing nodes of a graph that are partitioned into disjoint subgraphs by pruning the weighted edges of the graph. The total weight of the pruned edges between two subgraphs is called a cut, and the weights may be based on similarities in color, brightness, and/or texture. Graph cut-based feature can use a minimum cut criterion to find partitions that minimize a cut, or a normalized cut that depends on edge weights as well as the ratio of the total connection weights of nodes in each partition to all nodes of the graph.

Shape-based features can be represented as contours, edges, lines, boundary segments, gradient flow, or orientation fields of the query object represented in a query image. Three-dimensional features can be obtained by capturing a number of fixed views of the query object (and the database object) and extracting features and geometrical constraints from these views. Global or top-level features can include attributes of the query image (and database image) in its entirety and image classification labels, which can be learned using machine learning as discussed elsewhere herein. Composite features combine two or more of the aforementioned features, including local features and texture-based features, to generate "visual phrases." For example, k random contour points can be selected and a k-tuple can be generated based on relative orientations of the k contour points.

In some embodiments, an object recognition system can include a clustering module 206 that maps each extracted feature to a cluster center (i.e., feature quantization) using any suitable clustering algorithm (e.g., Hierarchical K-means, etc.). After the extracted features are clustered, the cluster centers can be assigned visual words or mapped to each of their own respective closest visual word. A visual word ID along with a corresponding cluster center are stored in visual word database 208 (e.g., Code Book) that can be used to look up a cluster center via a visual word or look up a visual word via a cluster center. Each visual word represents a small part of an image by carrying some kind of information related to its respective representative feature (e.g., color, shape, texture, etc.), or changes occurring in the pixels such as the filtering, low-level feature descriptors, and the like. Accordingly, a collection of visual words (i.e., a vocabulary) together provides information about a respective image and the content of the image. This vocabulary or representation can enable the use of standard text search and retrieval techniques for image retrieval. This technique of treating image features as words is also known as a bag-of-words model (BoW). BoW can be considered a vector of occurrence counts of words describing an image, which can be represented in a histogram over local image features, for example.

In the example of FIG. 2, the extracted features of each image can be compressed using a compression module 210.

Any type of compression known to those of ordinary skill in the art (e.g., lossy compression, lossless compression, etc.) can be used to reduce the number of bits of the extracted features. Accordingly, the extracted features are clustered according to a value associated with their nearest corresponding cluster center. The cluster centers that describe each image can also be compressed and stored in compressed features database 212. The words from visual word database 208 are assigned to each compressed cluster center using a word assignment module 214, and the visual words along with IDs for images that they describe are stored in index 216 (e.g., a Lucene index). Since the cluster centers (i.e., compressed local feature descriptors) each correspond to a visual word in index 216, the numbers of times each respective visual word appears in a respective image can be determined. Each image can, therefore be described using a histogram of visual words. Accordingly, index 216 of visual words to images can be made available for object recognition. Approaches for encoding and decoding compressed extracted features are discussed in co-pending U.S. patent application Ser. No. 14/133,252 entitled, "Scaleable Image Matching," filed Dec. 17, 2013, which is incorporated herein by reference.

The object recognition system can include a user interface module (not shown) for enabling a client device 222 to submit a query image to the object recognition system where, upon receiving the query image, the system extracts query features using a query feature extraction module 224. In some embodiments, the query feature extraction 224 module may use similar feature extraction techniques as feature extraction module 204 or any other suitable feature extraction algorithm. After the query features are extracted, visual words are assigned by a query word assignment module 226 using the visual words from visual word database 208. Although in this example the word assignment module 214 and query word assignment module 226 are illustrated as separate components, it will be appreciated that these modules can comprise a single module and/or use similar approaches for assigning words in various embodiments. The assigned words are then compared against index 216 by index searcher 228 to identify putative matches 230.

In some embodiments, once putative matches are calculated, a verification module 232 can be used to determine the putative matches that match closest to the query image by comparing the extracted query features to the cluster centers of each closest matching database image. At this stage, a look up table can be used to look up cluster centers of corresponding assigned words that match the query assigned words. The corresponding cluster centers are retrieved from compressed feature database 212 and compared to the extracted query features using a verification algorithm, such as RANSAC or a variation thereof. The closest matching database images are then scored by scoring module 236 based on their respective matching features and the top matches 238 are returned. In some embodiments, the object recognition system can include a multi-modal processing module 234 that obtains additional input from the client device 222. The additional input can include user feedback confirming results of the object recognition processing pipeline at various stages, additional images of different perspectives of the query object or portions of specific regions of the query object (e.g., regions including a logo or text), or other input data that may be relevant to object recognition, as discussed below. In some embodiments, the modes of input can be based on a classification of an object of interest represented in an image. For example, if the object of interest is classified as a television, a mode of input for this classification can include a request to the user to obtain an image of a logo or text corresponding to the television. As another example, if the object of interest is classified as shoes, a mode of input for this particular type or category of object can include a request to the user to obtain a top-down or bird's eye view of the shoes. Thus, in various embodiments, there may be some additional modes of input that are particularized for certain classes of objects while there may be other modes of input that are generalized for any type of object.

It will be apparent to those of ordinary skill in the art that an object recognition system could operate equally well in a system having fewer or a greater number of components than are illustrated in FIG. 2. Thus, the depiction of the system 200 in FIG. 2 should be taken as being illustrative in nature and not limiting to the scope of the disclosure.

Figure 3A:
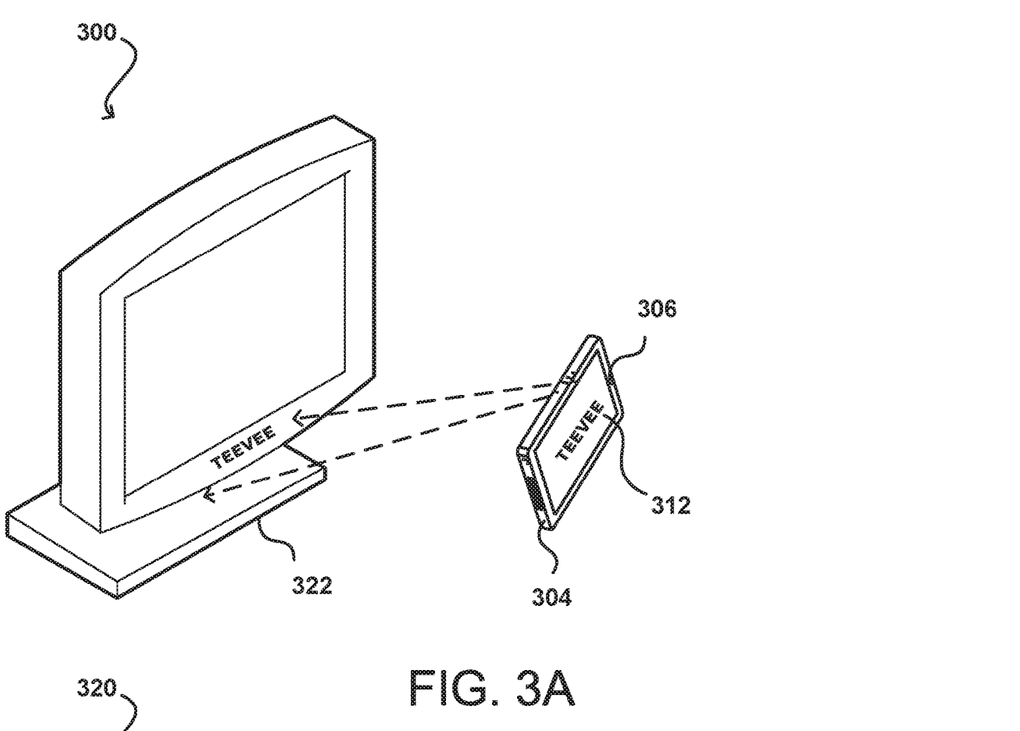
FIGS. 3A and 3B illustrate examples of multi-modal approaches for object recognition that can be used in accordance with various embodiments.
Figure 3B:
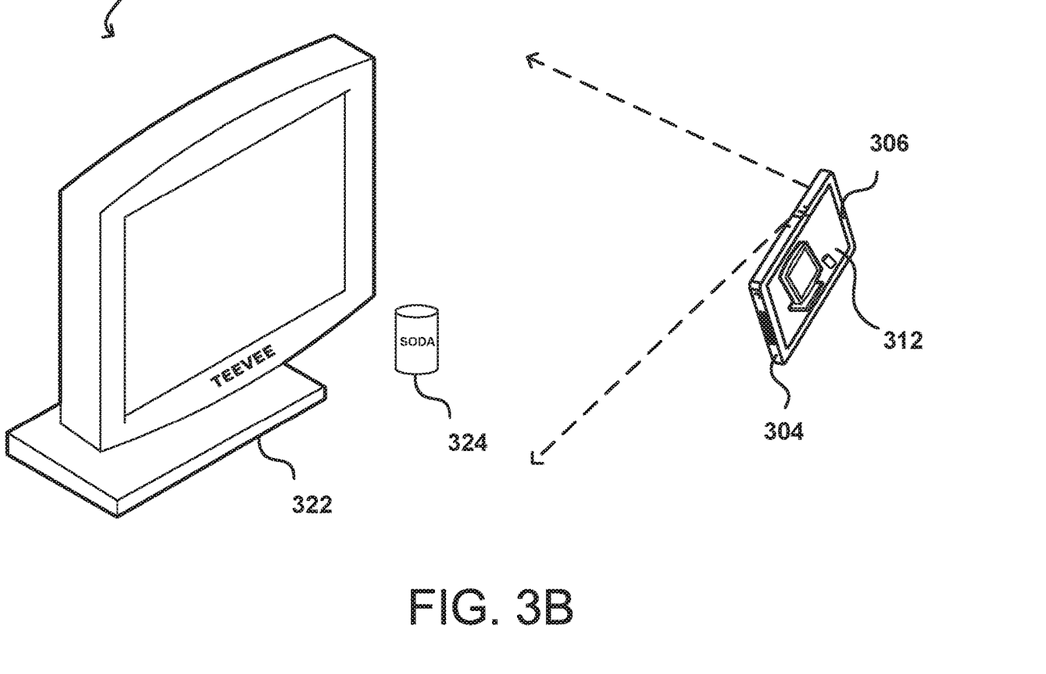

FIGS. 3A and 3B illustrate examples of multi-modal approaches for object recognition that can be used in accordance with an embodiment. In the example situation 300 of FIG. 3A, a query image including a representation of query object, television set 322, has previously been captured by a camera 306 of computing device 304 and submitted to an object recognition system, such as the example system 200 of FIG. 2. The query image has been processed by the object recognition system up to the object classification stage of the object recognition pipeline, and the query object has been classified as a television set. In other embodiments, depending upon other inputs or the classification algorithm utilized, the object recognition system may classify the query object with less specificity, such as identifying the query object simply as a rectangle or as an electronic display device, or with more specificity, such as an LCD television. For example, the computing device may include a GPS that determines the user to be located inside a retail electronics store such that the query object is likely to be an electronic device. As another example, the object recognition system may rely at least in part on user feedback for classification such as by confirming a type or category of the query object from a list of possible classifications identified by the system. As yet another example, user behavior data, such as previous visual-based or text-based queries directed towards televisions, or other user data, such as emails, voicemail, text messages, calendar entries, or social networking activities indicating that the user is television shopping may be used as an additional cue for classifying the query object.

In this example, the object recognition system has accurately classified the query object but may require additional information to identify the query object with even more specificity. Analysis of the query image previously captured by the user and submitted to the object recognition system may detect that the query object includes a logo or text but the logo or text may not be recognized by the system for a number of reasons, such as due to poor lighting conditions, specular reflection, clutter, occlusion, poor resolution due to the distance of the user from the query object or the characteristics of the image sensor and/or lens, among other possibilities. Accordingly, the object recognition system can provide instructions to the user to capture a close-up image of the logo or text of the query object. Image matching techniques can then be used to analyze a logo of the query object and/or optical character recognition (OCR) can be executed on the text included with the query object to recognize a brand or other identifying information of the query object. Similarly, the user can be directed to capture additional images of the query object from different perspectives to determine 3-D features of the query object or to allow recognition with higher confidence. For example, multiple images of a particular object in a product database may be obtained at different angles to enable image matching of the object from more than one angle or perspective. Thus, multiple captured images of the query object at various angles can be matched with database objects at corresponding angles or perspectives.

FIG. 3B illustrates an example situation 320 of another multi-modal approach for object recognition. In this example, the object recognition system may successfully recognize the query object to be a TeeVee LCD television set 322. However, the object recognition system may not be able to determine the model of the television set, such as whether the query object is the 42-inch model or the 47-inch model. Thus, the user may be directed to provide an additional image including the query object and another object of known dimensions that is readily available, a soda can 324, in this example. It will be appreciated that other objects can also be used to facilitate object recognition, such as a tape measure or ruler, a color or texture swatch, or the user's hand. The additional image, with the added contextual information, can be analyzed to determine the dimensions or other details (e.g., length, width, height, color, texture, etc.) of the query object to provide the user with more precise identifying information. In some embodiments, the camera 306 used to capture the query image can be calibrated; instructions for calibrating the camera, such as via a calibration pattern, can be provided to the user; and/or pre-calibration information can be stored, and photogrammetric techniques can be used to ascertain the dimensions of query objects without requiring capture of additional images. Calibration and photogrammetric algorithms are known to those of ordinary skill in the art, and will not be discussed herein in detail.

Figure 4:
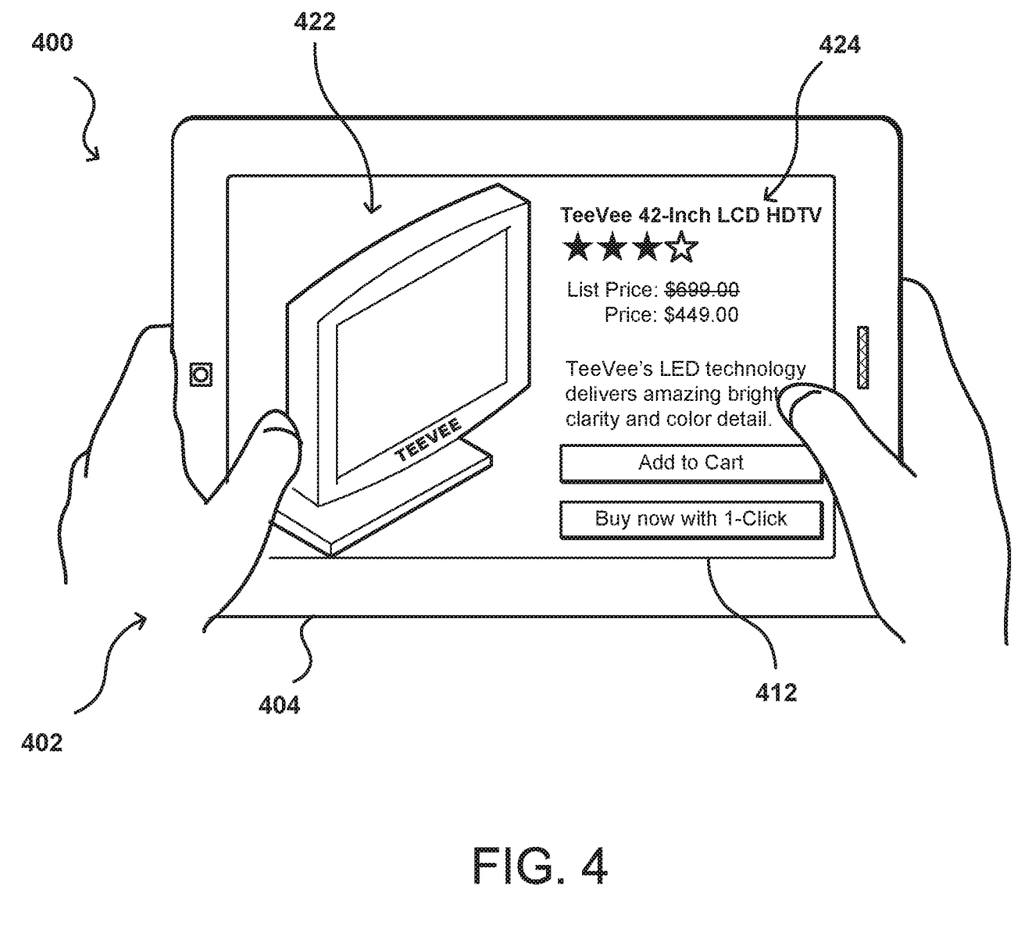
FIG. 4 illustrates an example approach for presenting identifying information for an object represented in an image that is recognized by an object recognition system such as that illustrated in FIG. 2.

FIG. 4 illustrates an example 400 of an approach for presenting identifying information for a query object recognized by an object recognition system, such as the example system 200 of FIG. 2. In this example, a live camera view of the query object 422 is presented to the user 402 on a display element 412 of the user's computing device 404. At least one image including a representation of the query object has previously been submitted to the object recognition system, and the object recognition has successfully identified the query object as a 42-inch high-definition LCD television from manufacturer TeeVee. The live camera view is part of the user interface (UI) of a product discovery application or "app" on computing device 404 that makes requests to the object recognition system on behalf of the user 402. Upon recognition of a query object, the object recognition system will transmit identifying information for the query object to the computing device 404, which is then provided to the product discovery app. The product discovery app's UI overlays the live camera view with the identifying information received from the object recognition system, such as the manufacturer and model of the query object, user ratings, price, and description. The product discovery app may also provide interactive elements such as virtual buttons enabling the user to purchase the query object from a provider of the product discovery app or hyperlinks directing the user to the webpage of the manufacturer. In some embodiments, there may be other interactive elements associated with the query objects. For example, clicking on particular regions of the query object in the live camera view may reveal more detailed information about the selected region. For instance, the television 422 may include a front-facing camera and clicking on a region near the camera may disclose the characteristics of the camera. As another example, the query object may be a clothing item, shoes, or jewelry and an interactive element may enable the user to change the appearance of the live camera view of the query object to other colors or patterns available for the clothing item, shoes, or jewelry. It will be appreciated that this feature can be enabled while the user is wearing the clothing item, shoes, or jewelry and the user is capturing a self-portrait or "selfie." Various other interactive elements can be used as well within the scope of the various embodiments.

In addition to being an input to a product discovery system, such as one illustrated in FIG. 4, it will be appreciated that information relating to recognized objects can also be applied to a variety of other applications in various embodiments. In some embodiments, an object of interest may comprise furniture and the recognized piece of furniture can be utilized by a home decoration or home remodeling application to enable the user to reposition the recognized furniture within a live camera view of a room and redecorate the room without the burden of physically moving the recognized furniture. Alternatively, or in addition, the recognized furniture could be substituted by alternative items to enable the user to virtually shop for new furniture. Such an approach can also be especially advantageous for items such as clothing, shoes, jewelry, and similar objects of interest. In some embodiments, a recognized object can be linked to a manufacturer's website or app and to enable the user to quickly obtain addition information about the recognized. Other similar approaches are contemplated and within the scope of various embodiments.

Figure 5:
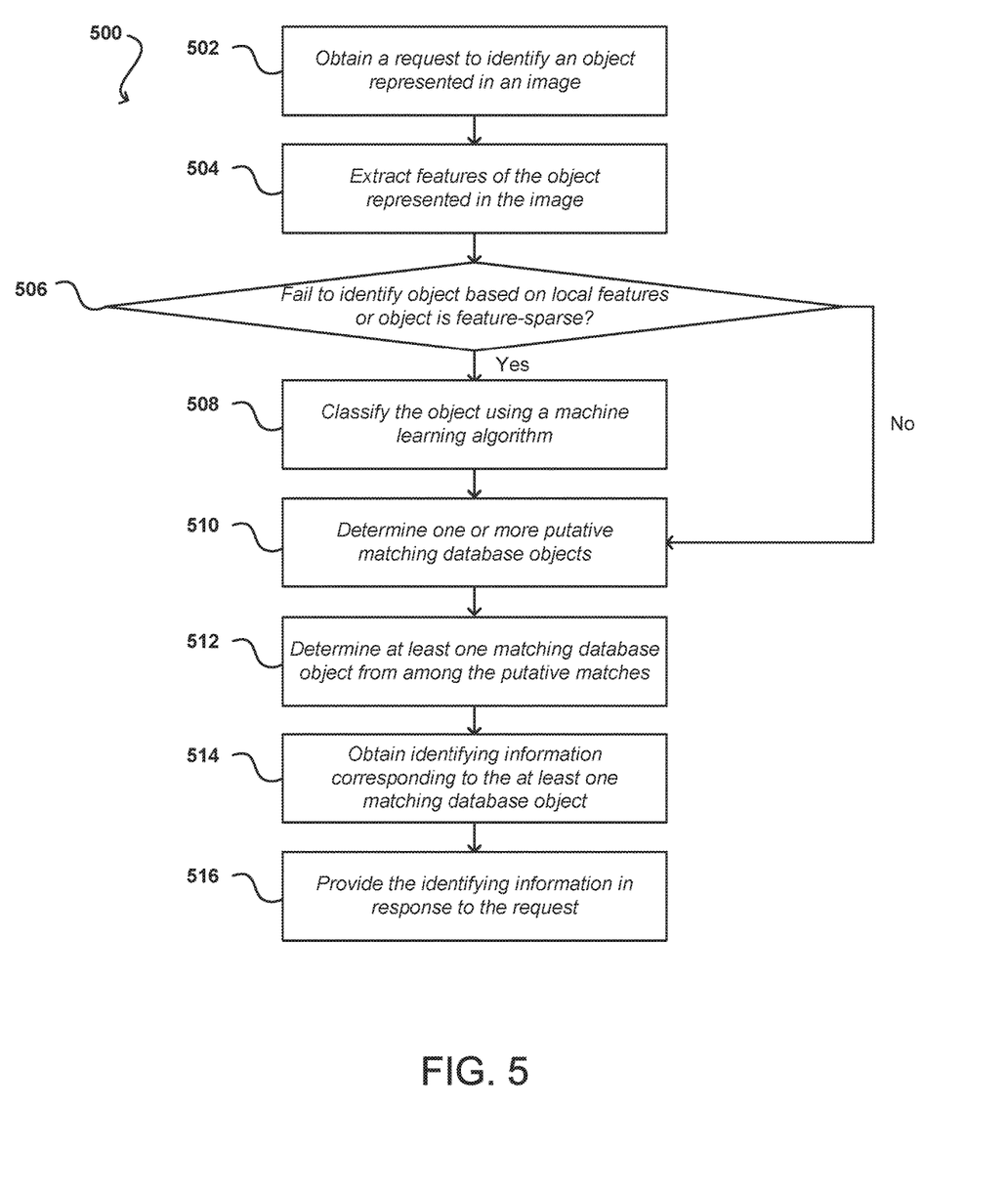
FIG. 5 illustrates an example process for recognizing an object represented in an image in accordance with an embodiment.

FIG. 5 illustrates an example process 500 for recognizing an object represented in an image in accordance with an embodiment. It should be understood that, for any process discussed herein, there can be additional, fewer, or alternative steps performed in similar or alternative orders, or in parallel, within the scope of the various embodiments unless otherwise stated. The process 500 may be initiated from a stand-alone application or app on a computing device, such as the product discovery app illustrated in FIG. 4, or a web-based interface for an object recognition system, such as the system illustrated in FIG. 2. The process may begin by obtaining a request to identify an object represented in an image 502. A set of features for the representation of the object can be extracted from the image 504. The set of features include at least one or more local features (e.g., ASG features, SIFT features, etc.). In some embodiments, these local features can be used to attempt to identify the object but the object recognition system may not successfully recognize the object based on the local features. As a result of unsuccessfully recognizing the object based on local features, one or more non-local features (e.g., color, region-based, shape-based, 3D, global, composite features, etc.) can be extracted and the object recognition system can attempt to recognize the object based on these non-local features. Alternatively, or in addition, the set of local features can be analyzed to determine that the object has a number of local features below a local feature threshold or extracted feature values may be below threshold feature values. Such an approach can be characterized as "serial" in that the object recognition system includes an initial matching stage based on local features and a subsequent matching stage based on non-local features in the event of the failure of the initial matching stage. In other embodiments, the object recognition may operate in "parallel" and one or more processes can be executed to identify an object based on local features and one or more separate processes can be executed to identify the object based on non-local features. In systems using a parallel approach, the final output may be based on the process(es) recognizing the object of interest with highest confidence, the process(es) that complete the fastest (e.g., the first recognize the object of interest), a weighted combination of the processes wherein weighting is based on recognition confidence, a machine learned rule, or other heuristic. In these various embodiments, the object is either not recognized based on local features or determined to be local feature-sparse and/or texture-limited 506. Upon determining that the object is not recognized based on local features or that the object is local feature-sparse, a machine learning algorithm can be applied to classify the object 508.

Examples of machine learning include principal component analysis (PCA), neural networks, support vector machines (SVM), inductive learning, adaptive boosting (Adaboost), deep learning, among others. In PCA, eigenvectors are computed on a training set of images known to include objects corresponding to a particular classification to determine the covariance matrix of the training set. Training images known to include the classified are projected onto "a classified object subspace" and clustered. The distance between a region of each training image known to include the classified object and the classified object subspace is computed for the training image. The distance from the classified object subspace is used as a measure of whether a query image includes a classified object, and the distances from the classified object subspace form a "classified object map." An object can be detected to be presented in a query image from the local minima of the "classified object map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include the multilayer neural network, the autoassociative neural network, the probabilistic decision-based neural network (PDBNN), and the sparse network of winnows (SNoW). Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of object at multiple resolutions. At each scale, a training image is decomposed into subregions and the subregions are further decomposed according to space, frequency, and orientation. The statistics of each projected subregion are estimated from the projected samples to learn the joint distribution of object and position. An object is determined to be within an image if the likelihood ratio is greater than the ratio of prior probabilities $$\left(\text{i.e., } \frac{P(\text{image}|\text{object})}{P(\text{image}|\text{non-object})} > \frac{P(\text{non-object})}{P(\text{object})}\right).$$

Inductive learning approaches include decision tree or random forest learning. Decision tree learning uses a decision tree as a predictive model which maps observations about an object (e.g., class-labeled training data) to conclusions about the object's target value (e.g., classification). A decision tree, for example, is a flow-chart-like structure wherein each internal (i.e., non-leaf) node represents a test on an attribute, each branch denotes the outcome of the test, and each terminal (i.e., leaf) node represents a class label or classification. Decision-tree learning can be based on Iterative Dichotomiser 3 (ID3), C4.5, Classification and Regression Tree (CART), Chi-squared Automatic Interaction Detector (CHAID), Multivariate adaptive regression splines (MARS), among others. Random forest learning uses a number of decision trees to improve the classification rate.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector. Viola-Jones scans a sub-window of an input image using features consisting of Haar-like features, black and white boxlets that are weighted during training, and resized over several passes of the detector. A sub-window is determined to be a candidate of a classified object if the difference of the sum of pixels within two regions meets a threshold θ for a Haar-like feature determined during the training stage. Viola-Jones further utilizes the concept of attentional cascading which observes that within an image, most sub-windows are not instances of the classified object. Thus, smaller and more efficient classifiers can be used to reject sub-windows unlikely to be the classified object at earlier stages of the detector while keeping almost all of the positive instances. More complex classifiers are used at later stages to examine candidates that have not been rejected as candidates of the classified object.

Deep learning involves modeling high-level abstractions in data using multiple non-linear transformations. Deep learning techniques are based on the premise that images can be represented in many ways but, from exemplars, certain representations can make it easier to learn tasks of interest, such as object classification of an object represented in an image. Deep learning techniques include deep neural networks, convolutional deep neural networks, and deep belief networks. As discussed, in addition to the object classification stage, machine learning techniques can also be implemented be at other stages of the object recognition pipeline, including image segmentation (e.g., separating the query object from the background and other objects or classification of pixels as boundary pixels), image matching (e.g., selecting a subset of similarity measures that best determines matches), global feature extraction (e.g., predicting high-level attributes which can be leveraged for multi-modal approaches for object classification), and/or vocabulary building, among other stages.

After the query object has been classified, extracted query features and the extracted features of database objects corresponding to the classification can be compared to determine putative matches 510. In some embodiments, each type of feature may have its own matching criterion to determine putative correspondences. As an example, dot products can be used for texture ASG features. Other similarity/distance measures include the Euclidean distance, Minkowski distance, Mahalanobis distance, quadratic form distance, Kullback-Leibler divergence, Jeffrey divergence, Hausdorff distance, Mallows distance, earth mover's distance, the integrated region matching distance, among others. As another example, some features can use a similarity measure based on a machine learned rule. From among the putative matches, at least one database object can be determined to match the query object based on a verification algorithm 512, such as RANSAC or a variation thereof.

In some embodiments, each type of feature may have its own version of RANSAC. These algorithms can be progressive and adaptive to eliminate putative correspondences caused by background noise. Further, knowledge of the classification of the object can be used to weight certain types of features more heavily with respect to other types of features. In some embodiments, the output from the execution of the particularized version of RANSAC for each type of feature can be aggregated to determine the final matching database objects.

After at least one database object has been determined to match the query object represented in the query image, identifying information corresponding to the database object can be retrieved 514 and transmitted to the user or other entity requesting for identification of the object 516. As discussed, multi-modal approaches can also be integrated at different stages of the object recognition pipeline, such as obtaining user feedback at different processing points, directing the user to obtain additional images of at least portions of the query object, and/or acquiring other data that may be relevant to the object recognition task, such as a location of the computing device, user behavior data, and the like. In some embodiments, the final matching database objects can be refined according to these other modal inputs (e.g., user feedback, logo detection, OCR of text corresponding to the query object, etc.)

Figure 6:
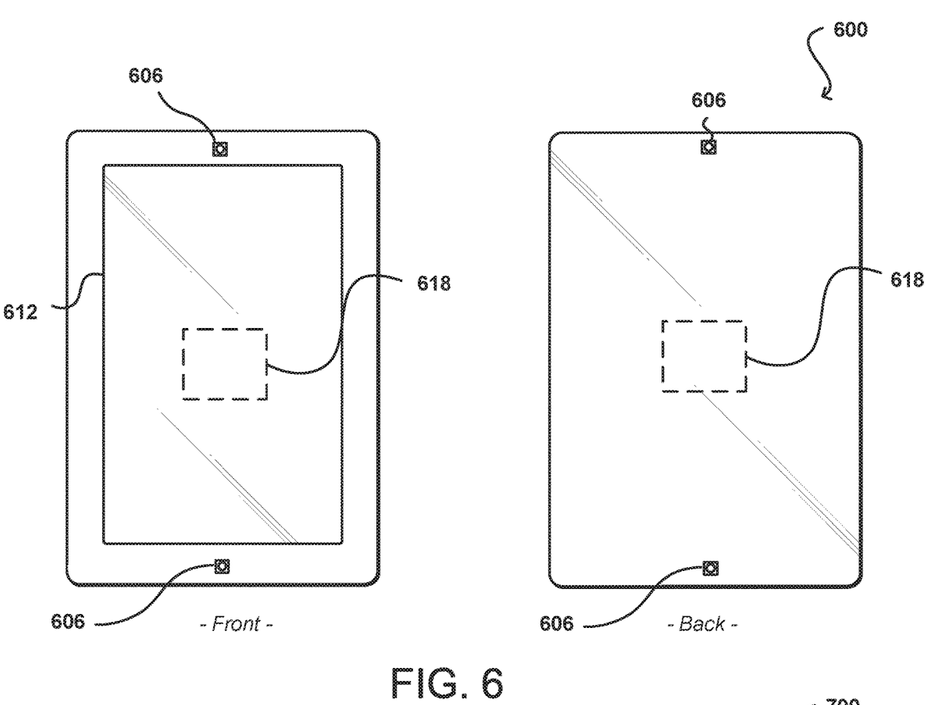
FIG. 6 illustrates an example computing device that can be used in accordance with various embodiments.

FIG. 6 illustrates an example computing device 600 that can be used to perform approaches described in accordance with various embodiments. In this example, the device includes two cameras 606 located at the top and bottom on each of a same and opposite side of the device as a display element 612, and enabling the device to capture images in accordance with various embodiments. It should be understood that, while the components of the example device are shown to be on a "front" and "back" of the device, there can be similar or alterative components on the "side" of the device as well (or instead). Further, directions such as "front," "back," "top," "bottom," and "side" are used for purposes of explanation and are not intended to require specific orientations unless otherwise stated. The computing device also includes a GPS 618 that can be used to determine the geocoordinates of the device.

Figure 7:
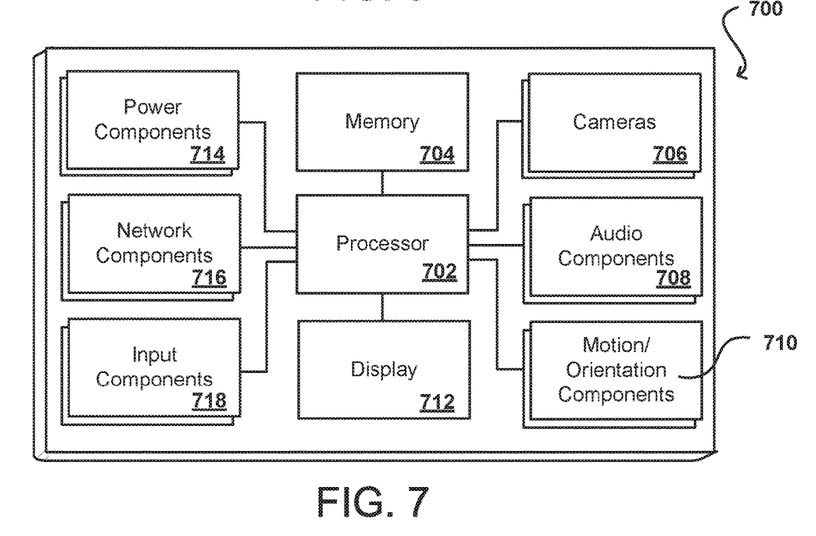
FIG. 7 illustrates an example configuration of components of a computing device such as that illustrated in FIG. 6.

FIG. 7 illustrates a logical arrangement of a set of general components of an example computing device 700 such as the device 600 described with respect to FIG. 6. In this example, the device includes a processor 702 for executing instructions that can be stored in a memory component 704. As would be apparent to one of ordinary skill in the art, the memory component can include many types of memory, data storage, or non-transitory computer-readable storage media, such as a first data storage for program instructions for execution by the processor 702, a separate storage for images or data, a removable memory for sharing information with other devices, etc. The device typically will include some type of display element 712, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. As discussed, the device in many embodiments will include one or more cameras or image sensors 706 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component 708, such as a mono or stereo microphone or microphone array, operable to capture audio information from at least one primary direction. A microphone can be a uni- or omni-directional microphone as known for such devices.

The device 700 also can include one or more orientation and/or motion sensors 710. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

The computing device 700 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 714 known in the art for providing power to a computing device, which can include capacitive charging elements for use with a power pad or similar device. The computing device can include one or more communication elements or networking sub-systems 716, such as a Wi-Fi, Bluetooth, RF, wired, or wireless communication system. The device in many embodiments can communicate with a network, such as the Internet, and may be able to communicate with other such devices. In some embodiments the device can include at least one additional input element 718 able to receive conventional input from a user. This conventional input can include, for example, a push button, touch pad, touchscreen, wheel, joystick, keyboard, mouse, keypad, or any other such component or element whereby a user can input a command to the device. In some embodiments, however, such a device might not include any buttons at all, and might be controlled only through a combination of visual and audio commands, such that a user can control the device without having to be in contact with the device.

In some embodiments, the device 700 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 700 may include a light-detecting element that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 700 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts his head to the left or right with respect to the device, the content rendered on the display element may likewise tilt to keep the content in orientation with the user.

Figure 8:
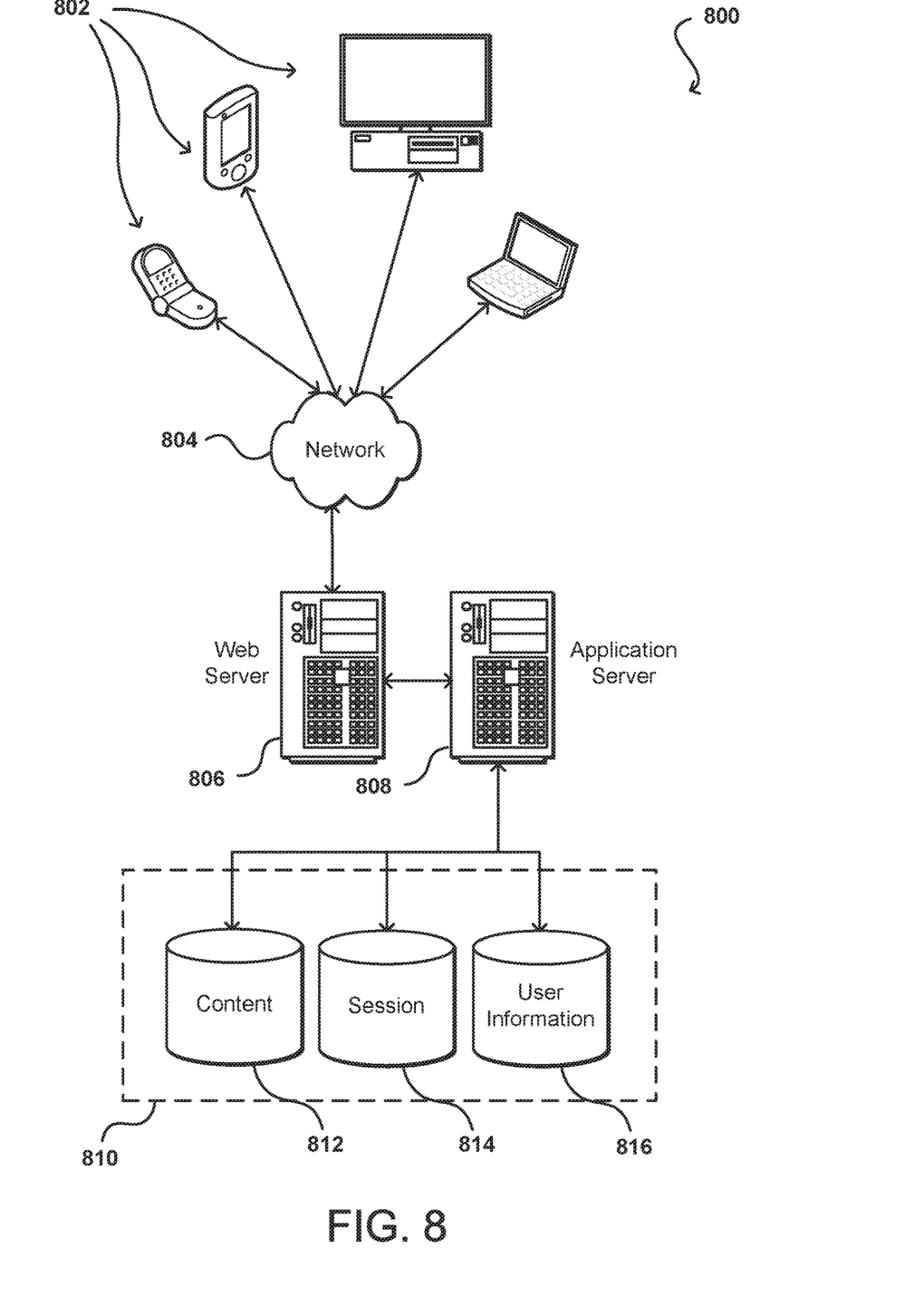
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto.

In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor;
   memory including instructions that, when executed by the at least one processor, cause the system to:
      obtain a request to identify an object represented in an image;
      determine a first image attribute and a second image attribute associated with the object, the first image attribute associated with a first pixel region that includes a representation of the object, the second image attribute associated with a second pixel region at least in part outside the first pixel region and of a second size;
      fail to identify the object based on the first image attribute;
      determine a classification of the object based at least in part upon the second image attribute; and
      determine a database object matching the object based at least in part upon the classification.

2. The system of claim 1, wherein the instructions when executed further cause the system to:
   obtain additional input data corresponding to a user associated with the request to identify the object, and
   determine the database object matching the object based at least in part upon the additional input data, and wherein the additional input data includes subsequent image data including at least one of a different perspective of the object, a logo corresponding to the object, text corresponding to the object, user behavior data relating to the object, or a location of a computing device that captured the image data.

3. The system of claim 1, wherein the first image attribute is a local feature and the second image attribute is a non-local feature.

4. The system of claim 1, wherein the first image attribute is different from the second image attribute.

5. The system of claim 1, wherein the second image attribute is one of a color feature attribute, a region-based feature attribute, a shape-based feature attribute, a global feature attribute, a three-dimensional (3D) feature attribute, or a composite feature attribute.

6. The system of claim 1, wherein the instructions when executed further cause the system to:
   use a machine learning algorithm with the second image attribute to determine the classification.

7. The system of claim 1, wherein the instructions when executed further cause the system to:
   verify that the database object matches the object based at least in part on a geometric verification of the second image attribute.

8. A computer-implemented method, comprising:
   obtaining a request to identify an object represented in an image;
   determining a first image attribute and a second image attribute associated with the object, the first image attribute associated with a first pixel region that includes a representation of the object, the second image attribute associated with a second pixel region at least in part outside the first pixel region and of a second size;
   failing to identify the object based on the first image attribute;

determining a classification of the object based at least in part upon the second image attribute; and determining a database object matching the object based at least in part upon the classification.

9. The computer-implemented method of claim 8, further comprising:

analyzing a database that includes stored images to determine a stored image associated with the classification;

determining a second image attribute for the stored image;

determining a similarity measure between the second image attribute and the second image attribute for the stored image; and determining whether the stored image matches the image based at least in part on the similarity measure.

10. The computer-implemented method of claim 8, further comprising:

obtaining information corresponding to the database object; and presenting the information.

11. The computer-implemented method of claim 10, wherein the information overlays a live view of the object.

12. The computer-implemented method of claim 11, wherein the information includes an interactive element for changing an appearance of the object.

13. The computer-implemented method of claim 8, further comprising:

obtaining additional input data corresponding to a user associated with the request to identify the object, and determining the database object matching the object based at least in part upon the additional input data, and wherein the additional input data includes subsequent image data including at least one of a different perspective of the object, a logo corresponding to the object, text corresponding to the object, user behavior data relating to the object, or a location of a computing device that captured the image data.

14. The computer-implemented method of claim 8, further comprising:

using a machine learning algorithm with the second image attribute to determine the classification.

15. The computer-implemented method of claim 8, further comprising:

verifying that the database object matches the object based at least in part on a geometric verification of the second image attribute.

16. A non-transitory computer-readable storage medium storing instructions, the instructions, which when executed by at least one processor of a computing system, cause the computing system to:

obtain a request to identify an object represented in an image;

determine a first image attribute and a second image attribute associated with the object, the first image attribute associated with a first pixel region that includes a representation of the object, the second image attribute associated with a second pixel region at least in part outside the first pixel region and of a second size;

fail to identify the object based on the first image attribute;

determine a classification of the object based at least in part upon the second image attribute; and determine a database object matching the object based at least in part upon the classification.

17. The non-transitory computer-readable storage medium of claim 16, wherein the instructions, when executed by the at least one processor, further cause the computing system to:

obtain additional input data corresponding to a user associated with the request to identify the object, and determine the database object matching the object based at least in part upon the additional input data, and wherein the additional input data includes subsequent image data including at least one of a different perspective of the object, a logo corresponding to the object, text corresponding to the object, user behavior data relating to the object, or a location of a computing device that captured the image data.

18. The non-transitory computer-readable storage medium of claim 16, wherein the instructions, when executed by the at least one processor, further cause the computing system to:

use a machine learning algorithm with the second image attribute to determine the classification.

19. The non-transitory computer-readable storage medium of claim 16, wherein the instructions, when executed by the at least one processor, further cause the computing system to:

verify that the database object matches the object based at least in part on a geometric verification of the second image attribute.

20. The non-transitory computer-readable storage medium of claim 16, wherein the instructions, when executed by the at least one processor, further cause the computing system to:

analyze a database that includes stored images to determine a stored image associated with the classification;

determine a second image attribute for the stored image;

determine a similarity measure between the second image attribute and the second image attribute for the stored image;

determine whether the stored image matches the image based at least in part on the similarity measure;

obtain information corresponding to the database object; and present the information.

* * * * *